(12) United States Patent
Scothern et al.

(10) Patent No.: US 10,935,125 B2
(45) Date of Patent: Mar. 2, 2021

(54) FLUID TRANSFER COUPLING

(71) Applicants: ROLLS-ROYCE plc, London (GB); Rolls-Royce Deutschland Ltd & Co KG, Dahlewitz (DE)

(72) Inventors: David P. Scothern, Derby (GB); Stephan Uhkötter, Berlin (DE)

(73) Assignees: Rolls-Royce plc; Rolls-Royce Deutschland LTD & Co. KG

( * ) Notice: Subject to any disclaimer, the term of this patent is extended or adjusted under 35 U.S.C. 154(b) by 436 days.

(21) Appl. No.: 15/897,499

(22) Filed: Feb. 15, 2018

(65) Prior Publication Data

US 2018/0231115 A1    Aug. 16, 2018

(30) Foreign Application Priority Data

Feb. 16, 2017    (GB) ..................................... 1702503

(51) Int. Cl.
| | |
|---|---|
| *F16H 57/04* | (2010.01) |
| *F04D 1/00* | (2006.01) |
| *F16J 15/00* | (2006.01) |
| *F16J 15/3204* | (2016.01) |
| *F16D 33/02* | (2006.01) |

(52) U.S. Cl.
CPC ........... *F16H 57/043* (2013.01); *F04D 1/003* (2013.01); *F16D 33/02* (2013.01); *F16H 57/0427* (2013.01); *F16H 57/0471* (2013.01); *F16H 57/0482* (2013.01); *F16J 15/002* (2013.01); *F16J 15/3204* (2013.01)

(58) Field of Classification Search
CPC ............... F16H 57/043; F16H 57/0427; F16H 57/0471; F16H 57/0482; F04D 1/003; F16D 33/02; F16J 15/002; F16J 15/3204
See application file for complete search history.

(56) References Cited

U.S. PATENT DOCUMENTS

| | | | |
|---|---|---|---|
| 3,791,757 A | 2/1974 | Tarifa et al. | |
| 4,086,766 A * | 5/1978 | Stieger | F16D 33/02 60/330 |

(Continued)

FOREIGN PATENT DOCUMENTS

| | | |
|---|---|---|
| DE | 102007033644 | 1/2009 |
| GB | 921570 A | 3/1963 |
| GB | 2045350 | 10/1980 |

OTHER PUBLICATIONS

Great Britain Search Report dated May 31, 2017 issued in GB Patent Application No. 1702503.2.

(Continued)

*Primary Examiner* — Michael R Mansen
*Assistant Examiner* — Robert T Reese
(74) *Attorney, Agent, or Firm* — Barnes & Thornburg LLP

(57) ABSTRACT

A fluid transfer coupling comprises a first shaft assembly a second shaft assembly, and a seal assembly. The first shaft assembly comprises a first shaft and an annular fin attached to the first shaft, the annular fin having one or more internal passages extending therethrough. Each internal passage connects a centre portion of the first shaft to a radially outwardly facing side of the annular fin. The second shaft assembly comprises a second shaft and an annular trough extending radially outwardly of the second shaft.

20 Claims, 5 Drawing Sheets

(56) References Cited

U.S. PATENT DOCUMENTS

| | | | | |
|---|---|---|---|---|
| 4,281,962 | A | * | 8/1981 | Erickson .................. F04D 1/12 |
| | | | | 415/89 |
| 5,135,353 | A | | 8/1992 | Westhoff et al. |
| 5,735,676 | A | * | 4/1998 | Loos ....................... F01D 25/18 |
| | | | | 417/407 |
| 9,719,516 | B2 | * | 8/2017 | Neilson .................... F04D 1/12 |
| 2016/0102751 | A1 | | 4/2016 | Scothern |
| 2016/0245410 | A1 | * | 8/2016 | Hoehle ................... F16J 15/40 |

OTHER PUBLICATIONS

Extended EP Search Report completed on Jul. 18, 2018 and issued in connection with EP Appln. No. 18154338.0.

\* cited by examiner

FLUID TRANSFER COUPLING

CROSS-REFERENCE TO RELATED APPLICATIONS

This application is based upon, and claims the benefit of priority from UK Patent Application No. GB 1702503.2, filed on 16 Feb. 2017, the entire contents of which are hereby incorporated by reference.

BACKGROUND OF THE INVENTION

Field of the Invention

The present invention relates to an improved fluid transfer coupling and particularly, but not exclusively, to an improved fluid transfer coupling for a gas turbine engine.

Description of Related Art

There is a requirement in many rotating systems to be able to transfer fluid under pressure across an interface where there is relative rotation between two parts of the system.

A common aerospace application requiring fluid transfer between rotating components is the planetary epicyclic gearbox used in a gas turbine engine. In one such application, a gearbox input may be connected to the sun gear and rotating at high speed, with a gearbox output being connected to the planet gear carrier and rotating at low speed. It is desirable to be able to supply pressurised oil to the planet bearings.

A conventional solution to the above-mentioned fluid transfer requirement is the use of a scoop that uses the relative rotation to collect oil from a trough using the dynamic pressure head resulting from the difference in rotation.

A disadvantage of the dynamic scoop approach is that the dynamic pressure head is dependent upon the rate of rotation of the fluid receiving system. In situations where this rate of rotation is low, such as the planet carrier of an epicyclic gearbox, the pressure that may be developed may be insufficient to supply an oil jet or hydraulic actuator with the necessary fluid pressure.

In aerospace gas turbine applications, this may cause in-flight engine shutdown, aircraft diversion and/or unplanned engine removal.

There is therefore a need for a fluid transfer coupling that can efficiently deliver fluid over the entire operational speed envelope for a mechanical system including start-up and low rotational speed conditions.

BRIEF SUMMARY OF THE INVENTION

According to a first aspect of the present invention there is provided a fluid transfer coupling including: a first shaft assembly; a second shaft assembly; and a seal assembly, the first shaft assembly comprising: a first shaft; and an annular fin attached to the first shaft, the annular fin having one or more internal passages extending therethrough, the or each internal passage connecting a centre portion of the first shaft to a radially outwardly facing side of the annular fin, the second shaft assembly comprising: a second shaft; and an annular trough extending radially outwardly of the second shaft, wherein the first shaft is concentrically accommodated within the second shaft with the annular fin accommodated within the annular trough, the seal assembly seals the annular trough, and in use, a fluid is delivered to the annular trough, the first shaft assembly rotates at a first rotational speed and the second shaft assembly rotates at a second rotational speed, the second rotational speed being greater than the first rotational speed, the difference between the second rotational speed and the first rotational speed causes a fluid contained within the annular trough to be driven radially inwardly through the or each internal passage to the centre portion of the first shaft.

The annular fin attached to the first shaft rotates more slowly than the fluid contained within the annular trough. Consequently, the radial acceleration acting on the fluid within the or each internal passage is much lower than the radial acceleration acting on the fluid contained within the annular trough.

As a result the radial pressure gradient within the or each internal passage is lower than that within the main fluid volume within the annular trough. However, the fluid pressure at the radially outwardly facing side of the annular fin must equal the fluid pressure of the fluid within the annular trough.

Thus, this radial pressure gradient will drive the fluid radially inwardly through the or each internal passage from the annular trough to the centre portion of the first shaft. The seal assembly enables the fluid transfer coupling to generate a fluid pressure when the rotational speed of the first shaft and/or the second shaft is very low, and also when the or each of the first and second shaft is stationary.

The seal assembly allows the fluid transfer coupling to deliver fluid to the centre portion of the first shaft as soon as there is rotational movement of the first and second shaft assemblies. In other words, the fluid transfer coupling of the disclosure provides for a delivery of fluid directly from the start-up condition through to operational rotational speeds.

An advantage of the fluid transfer coupling of the invention is that it can provide a supply of pressurised fluid into a rotating system without complete reliance on seals whose failure may starve the system of fluid causing failure of the system. This makes the coupling of the invention more reliable than conventional fluid transfer couplings, which is advantageous to a user.

A further advantage of the fluid transfer coupling of the invention is that the fluid pressure developed in the or each internal passage is decoupled from the rotational speed of the first shaft assembly. This makes the fluid transfer coupling of the invention applicable to more applications than conventional fluid transfer couplings, which is more convenient for a user.

In one arrangement, the seal assembly seals the annular trough against a radially outwardly facing surface of the first shaft assembly.

Optionally, the fluid is delivered to the annular trough through one or more one or more static oil jets positioned radially outwardly of the first shaft assembly.

The or each static oil jet delivers a supply of fluid to the annular trough. In one arrangement, the static oil jet is formed as an annular component with one or more apertures at an end proximal to the annular fin. The fluid is discharged in a radially outwardly direction into the annular trough.

Optionally, the fluid is delivered to the annular trough through one or more passageways extending along a length of the first shaft.

The use of the first shaft to deliver the fluid to the annular trough makes the assembly simpler both to manufacture and to assemble, and provides for a more compact arrangement.

Optionally, the fluid is delivered to the annular trough through one or more passageways extending along a length of the second shaft.

The use of the second shaft to deliver the fluid to the annular trough makes the assembly simpler both to manufacture and to assemble, and provides for a more compact arrangement.

Optionally, the seal assembly comprises a first sealing element on a first end of the annular trough, and a second sealing element on a second axially opposite end of the annular trough, with the fluid being delivered to the annular trough between the first and second sealing elements.

In this arrangement, a single seal element is positioned on one side of the annular trough and seals against the first shaft assembly. A second seal element is positioned on an axially opposite side of the annular trough and each seals against the first shaft assembly. The delivery of the fluid into the annular trough is arranged to be between one of the pair of seal elements and the annular fin.

Optionally, the seal assembly comprises a first sealing element on a first end of the annular trough, and second and third sealing elements on a second axially opposite end of the annular trough, with the fluid being delivered to the annular trough between the second and third sealing elements.

In this arrangement, a single seal element is positioned on one side of the annular trough and seals against the first shaft assembly. A pair of seal elements is positioned on an axially opposite side of the annular trough and each seals against the first shaft assembly. The delivery of the fluid into the annular trough is arranged to be between the pair of seal elements.

Whilst slightly more complex than a 'two seal' arrangement, the 'three seal' arrangement prevents the delivered fluid from contacting the first shaft assembly with the consequential pressure loss.

Optionally, each of the sealing elements is a lift-off seal.

A lift-off seal is a seal that provides a rubbing contact between the sealing surfaces from start-up through low relative rotational speed. Above a threshold rotational speed the rubbing part of the seal 'lifts off' from the surface against which it is rubbing. This eliminates the rubbing wear and frictional losses that might otherwise be experienced at rotational speeds above the threshold value. Such seals are well known in the art and are not described further herein.

Optionally, the or each passage comprises a single annular volume.

In one arrangement, the annular fin is formed from two disc shaped elements positioned side by side with the annular volume formed therebetween. Such an arrangement is simple and cost effective to manufacture making it convenient for a user.

Optionally, the or each passage comprises a plurality of radially extending holes.

In an alternative arrangement, the annular fin is formed as a disc with a plurality of holes extending radially therethrough from a centre portion of the annular fin to a radially outwardly facing side of the annular fin.

In one such alternative arrangement the holes may be formed by machining. In another alternative arrangement the annular fin may be formed as a casting with the holes formed as part of the casting process. In a further alternative arrangement, the annular fin may be formed using a material deposition process with the holes being formed as an integral part of the forming process.

Optionally, the ratio of the second rotational speed to the first rotational speed is between approximately 6:1 and 2:1.

Optionally, the ratio of the second rotational speed to the first rotational speed is between approximately 5:1 and 3:1.

Optionally, the ratio of the second rotational speed to the first rotational speed is approximately 3:1.

Optionally, the first shaft assembly rotates in an opposite direction to the second shaft assembly.

Contra-rotation will reduce the mean speed of the fluid in the annular trough and hence the driving pressure gradient. However, there will be no corresponding reduction in the speed of fluid within the annular fin and the corresponding radial pressure gradient within the or each internal passage. This will reduce the fluid transfer efficiency of the fluid transfer coupling.

Optionally, the or each internal passage comprises one or more radially extending first vanes arranged within the respective passage.

The radially extending first vanes minimise the rotational velocity of the fluid contained within the one or more internal passages. This minimises the radial pressure gradient of the fluid contained within the one or more internal passages, which in turn maximises the pressure of the fluid delivered to the centre portion of the first shaft. This makes the fluid transfer coupling of the invention more efficient.

Optionally, the annular trough comprises a plurality of radially extending second vanes projecting axially into a volume defined by the annular trough.

The radially extending second vanes act to maintain the rotational velocity of the fluid contained within the annular trough close to the rotational velocity of the annular trough itself. This minimises fluid losses caused within the annular trough making the fluid transfer coupling of the invention more efficient.

Optionally, the or each internal passage has an axial dimension of between approximately 0.5 mm and 3 mm.

Optionally, the or each internal passage has an axial dimension of between approximately 0.5 mm and 1.5 mm.

According to a second aspect of the present invention there is provided a method of using a fluid transfer coupling, the fluid transfer coupling comprising a first shaft assembly, a second shaft assembly, and a seal assembly, the first shaft assembly comprising a first shaft and an annular fin attached to the first shaft, the annular fin having one or more internal passages extending therethrough, the or each internal passage connecting a centre portion of the first shaft to a radially outwardly facing side of the annular fin, the second shaft assembly comprising a second shaft and an annular trough extending radially outwardly of the second shaft, the method comprising the steps of: (i) arranging the first shaft assembly concentrically within the second shaft assembly with the annular fin being accommodated within the annular trough, and with the seal assembly sealing the annular trough against a radially outwardly 10 facing surface of the first shaft assembly; (ii) introducing a supply of fluid to the annular trough; (iii) driving the first shaft assembly at a first rotational speed and the second shaft assembly at a second rotational speed, where the second rotational speed is greater than the first rotational speed; and (iv) the difference between the second rotational speed and the first rotational speed causing the fluid to be driven radially inwardly from the trough through the or each internal passage to the centre of the first shaft.

Optionally, step (iii) comprises the step of: (iii)' driving the first shaft assembly at a first rotational speed and the second shaft assembly at a second rotational speed, and the ratio of the second rotational speed to the first rotational speed is between approximately 6:1 and 2:1.

Optionally, step (iii) comprises the step of: (iii)" driving the first shaft assembly at a first rotational speed and the second shaft assembly at a second rotational speed, and the ratio of the second rotational speed to the first rotational speed is between approximately 5:1 and 3:1.

Optionally, step (iii) comprises the step of: (iii)''' driving the first shaft assembly at a first rotational speed and the second shaft assembly at a second rotational speed, and the ratio of the second rotational speed to the first rotational speed is approximately 4:1.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

There now follows a description of an embodiment of the invention, by way of non-limiting example, with reference being made to the accompanying drawings in which.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 1:
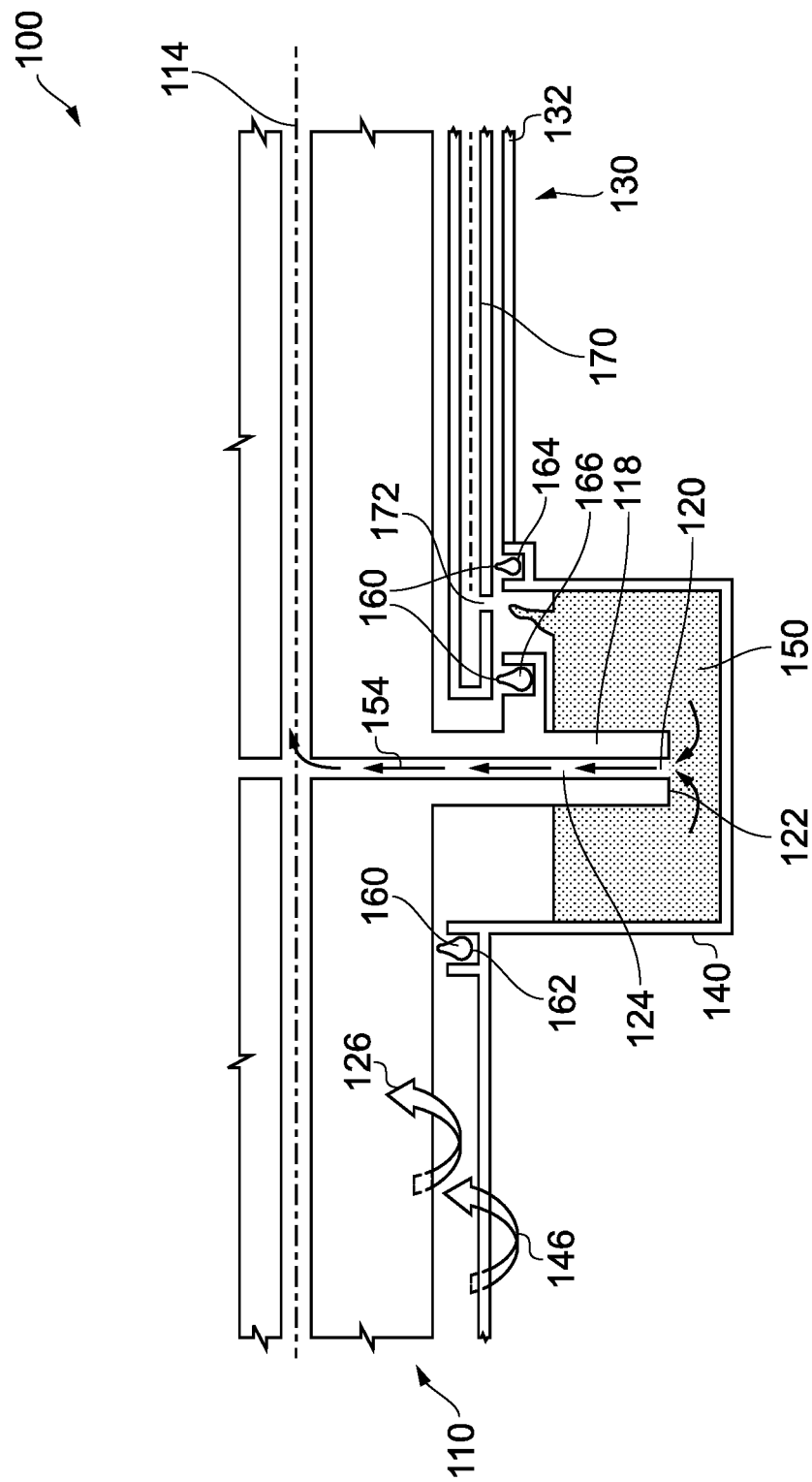
FIG. 1 shows a schematic sectional view of a fluid transfer coupling according to a first embodiment of the invention.

Referring to FIG. 1, a fluid transfer coupling according to a first embodiment of the invention is designated generally by the reference numeral 100. The fluid transfer coupling 100 comprises a first shaft assembly 110, a second shaft assembly 130, and a seal assembly 160. In the embodiment shown, the fluid transfer coupling forms part of an epicyclic gearbox (not shown) within a gas turbine engine (not shown).

Each of the first shaft assembly 110 and the second shaft assembly 130 is formed from an alloy steel suitable for use in an epicyclic gearbox.

The first shaft assembly 110 comprises a first shaft 112, and an annular fin 118 attached to the first shaft 112. The first shaft has a centre portion 114. In the present embodiment the centre portion 114 is a hole extending axially along the centre line of the first shaft 112. This hole may be used to feed pressurised fluid along the first shaft 112.

Figure 4A:
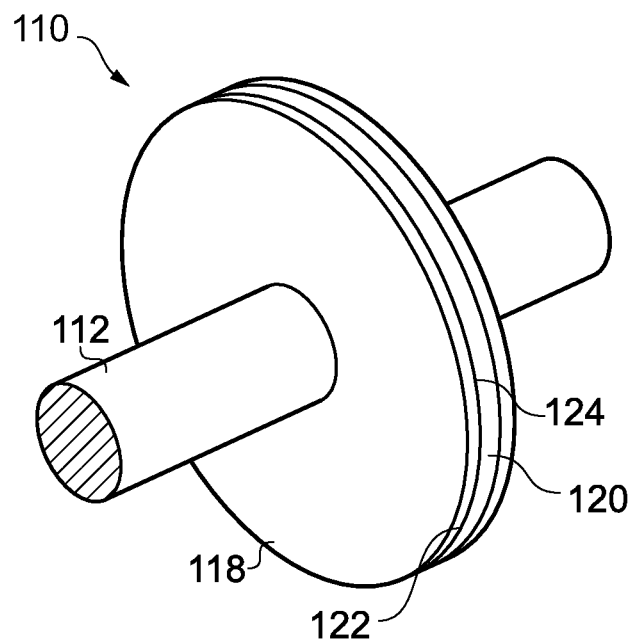
FIG. 4A shows a schematic perspective view of a first shaft assembly of the fluid transfer coupling of FIG. 1.

As shown in FIG. 4A, the annular fin 118 comprises an internal passage 120 formed as a single annular volume 124 which fluidly connects the centre portion 114 of the first shaft 112 to a radially outwardly facing side 122 of the annular fin 118. In other words, the annular fin 118 is formed as two discs axially spaced apart from one another to thereby form the single annular volume 124 therebetween.

In the present arrangement of the fluid transfer coupling 100, the annular fin 118 is separately formed, for example by machining, casting or an alternative manufacturing process, and subsequently attached to the first shaft 112.

The second shaft assembly 130 comprises a second shaft 132 and an annular trough 140 extending radially outwardly of the second shaft 132.

Speed ratios will be an output of the wider engine architecture—the annular trough 140 will rotate with the power gearbox input (or sun) gear, while the annular fin 118 will rotate with the output (planet carrier).

The first shaft 110 is concentrically accommodated within the second shaft 130 with the annular fin 118 accommodated within the annular trough 140.

This concentric arrangement of the first and second shaft assemblies requires that the first shaft assembly 110 be assembled inside the second shaft assembly 130.

In one arrangement, the annular trough 140 is separately formed, for example by machining, forging, casting or another manufacturing process, and subsequently attached to the second shaft 132.

A static oil jet 170 is positioned between the first shaft assembly 110 and the second shaft assembly 130. In this arrangement, the static oil jet 170 is formed as an annular component that is accommodated radially between the first shaft assembly 110 and the second shaft assembly 130.

The static oil jet 170 has an outlet aperture 172 positioned at a distal end and directed radially outwardly into the annular trough 140.

The seal assembly 160 comprises a first seal element 162, a second seal element 164, and a third seal element 166. Each of the first, second and third seal elements 162,164,166 take the form of lift-off seals. In other arrangements, the first, second and third seal elements 162,164,166 may be lip seals or any other form of rotating seal.

The first seal element 162 is positioned at one side of the annular trough 140 and seals the second shaft 132 against the first shaft 112. The second seal element 164 is positioned at the other axially opposite end of the annular trough 140 and seals the second shaft 132 against the static oil jet 170. The third seal element 166 is positioned on the annular fin 118, between the first seal element 162 and the second seal element 164. The third seal element 166 seals the second shaft 132 against the static oil jet 170.

In use, a fluid 150 is delivered to the annular trough 140 via the static oil jet 170. The presence of the seal elements 162, 164, 166 allows the delivery of the fluid 150 to pressurise the annular trough 140, and thereby deliver fluid to the centre portion 114 of the first shaft 112.

Once rotation of the first and second shaft assemblies 110,130 begins, the first shaft assembly 110 rotates at a first rotational speed 126 and the second shaft assembly 130 rotates at a second rotational speed 146. The second rotational speed 146 is greater than the first rotational speed 126.

When the rotational speeds of the first shaft assembly 110 and the second shaft assembly 130 reach a pre-determined threshold value, the first, and second and third seal elements 162,164,166 will 'lift-off' from the surfaces against which they are rotationally contacting. This will eliminate friction and wear of the rubbing elements during this 'high speed' operation.

In the present example, the second rotational speed 146 is four (4) times greater than the first rotational speed 126. In other examples of the invention, this ratio of the second rotational speed 146 to the first rotational speed 126 may be between approximately two (2) and six (6) to one (1).

This difference in rotational speed between second shaft assembly 130 and the first shaft assembly 110 causes a radial pressure gradient between the fluid within the annular volume 124 and the fluid 150 within the annular trough 140. This results in the fluid 150 contained within the annular trough 140 being driven radially inwardly through the annular volume 124 to the centre portion 114 of the first shaft 112 as a fluid flow 154.

Figure 2:
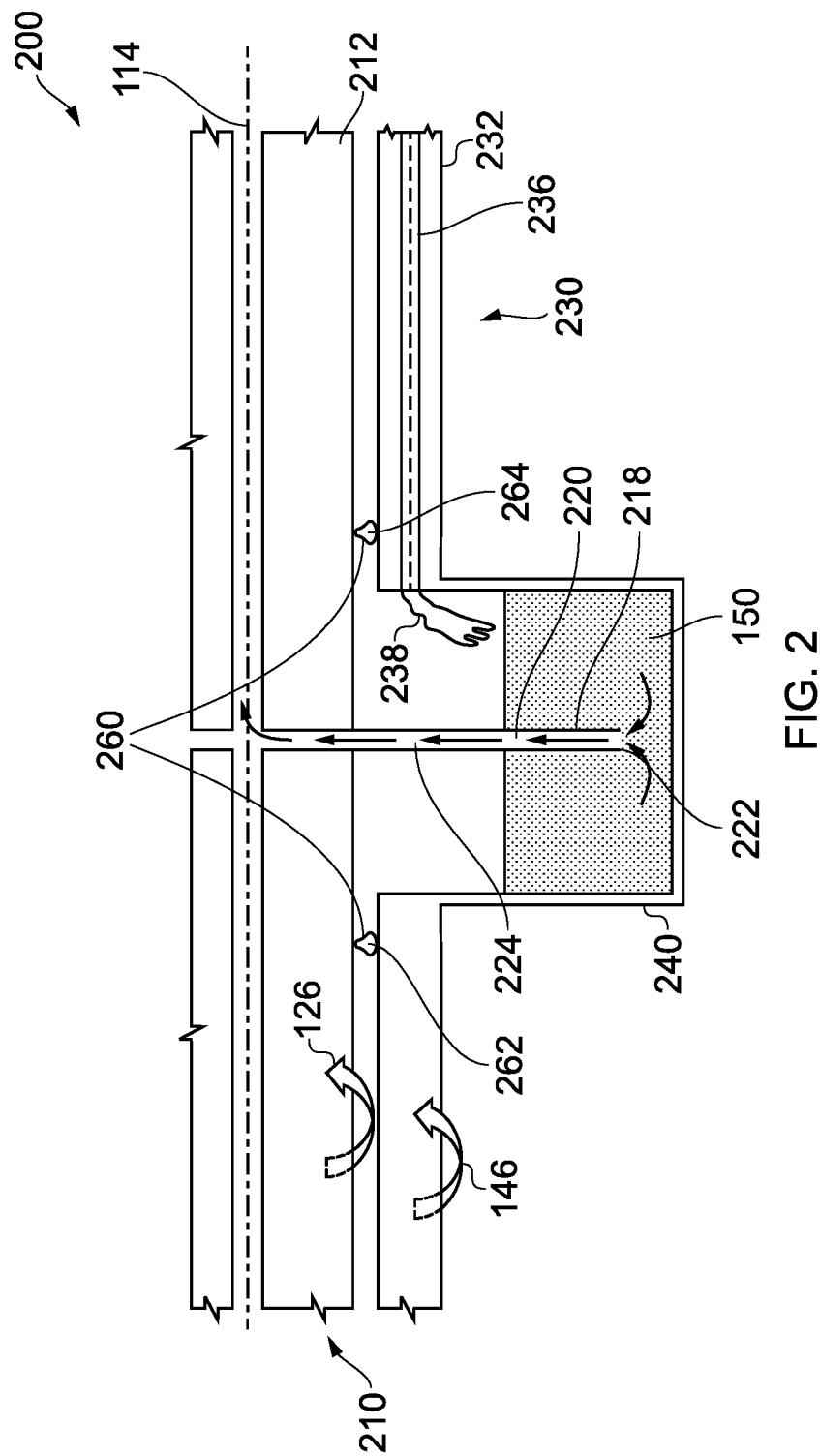
FIG. 2 shows a schematic sectional view of a fluid transfer coupling according to a second embodiment of the invention.

FIG. 2 shows a fluid transfer coupling according to a second embodiment of the invention that is designated generally by the reference numeral 200. Features of the fluid transfer coupling 200 which correspond to those of the fluid transfer coupling 100 have been given corresponding reference numerals for ease of reference.

The fluid transfer coupling 200 comprises a first shaft assembly 210, a second shaft assembly 230, and a seal assembly 260.

The first shaft assembly 210 comprises a first shaft 212, and an annular fin 218 attached to the first shaft 212. The first shaft has a centre portion 114. In the present embodiment the centre portion 114 is a hole extending axially along the centre line of the first shaft 212.

As described above, the annular fin 118 comprises an internal passage 120 formed as a single annular volume 124 which fluidly connects the centre portion 114 of the first shaft 112 to a radially outwardly facing side 222 of the annular fin 218.

The second shaft assembly 230 comprises a second shaft 232 and an annular trough 240 extending radially outwardly of the second shaft 232.

As for the first embodiment, the first shaft 210 is concentrically accommodated within the second shaft 230 with the annular fin 218 accommodated within the annular trough 240.

A fluid delivery passageway 236 is provided in the second shaft 232. The fluid delivery passageway 236 extends axially along the second shaft 232 exhausting at an aperture 238 that is in fluid communication with the annular trough 240. In this arrangement, fluid delivery passageway 236 is oriented so as to direct fluid 150 axially through the aperture 317 and towards the annular fin 218.

The seal assembly 260 comprises a first seal element 262, and a second seal element 264. Each of the first and second seal elements 262,264 takes the form of lift-off seals. In other arrangements, the first and second seal elements 262, 264 may be lip seals or any other form of rotating seal.

The first seal element 262 is positioned at one side of the annular trough 240 and seals the second shaft 232 against the first shaft 212. The second seal element 264 is positioned at the other axially opposite end of the annular trough 240 and seals the second shaft 232 against the first shaft 212.

In use, a fluid 150 is delivered to the annular trough 218 via the fluid delivery passageway 236. The presence of the seal elements 262,264 allows the delivery of the fluid 150 to pressurise the annular trough 240, and thereby deliver fluid to the centre portion 114 of the first shaft 212.

Subsequent operation of the fluid transfer coupling 200 is identical to that described above for the first embodiment of the disclosure.

Figure 3:
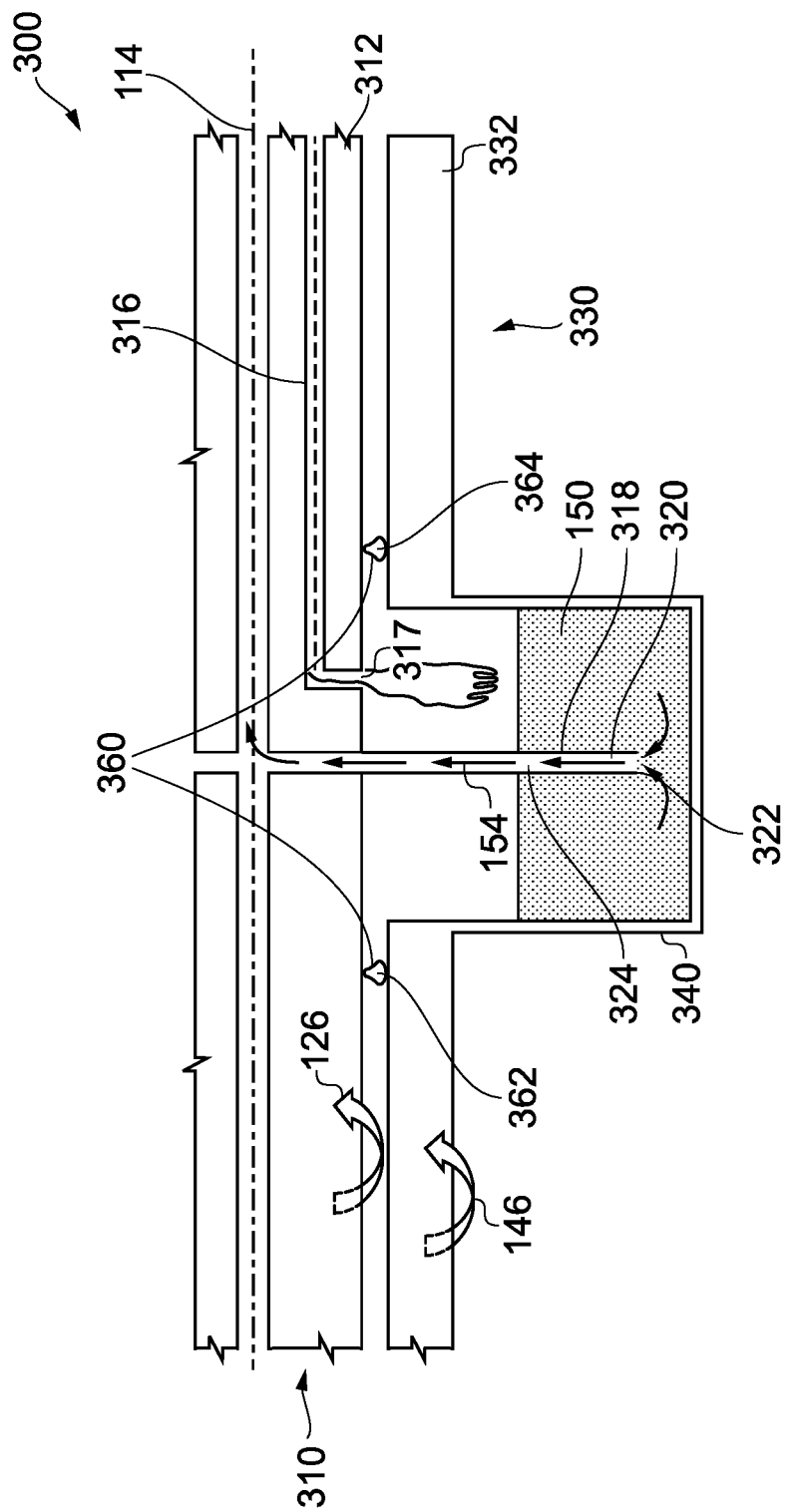
FIG. 3 shows a schematic sectional view of a fluid transfer coupling according to a third embodiment of the invention.

FIG. 3 shows a fluid transfer coupling according to a third embodiment of the invention that is designated generally by the reference numeral 300. Features of the fluid transfer coupling 300 which correspond to those of the fluid transfer coupling 100 have been given corresponding reference numerals for ease of reference.

The fluid transfer coupling 300 comprises a first shaft assembly 310, a second shaft assembly 330, and a seal assembly 360.

The first shaft assembly 310 comprises a first shaft 312, and an annular fin 318 attached to the first shaft 312. The first shaft has a centre portion 114. In the present embodiment the centre portion 114 is a hole extending axially along the centre line of the first shaft 312.

As described above, the annular fin 318 comprises an internal passage 320 formed as a single annular volume 324 which fluidly connects the centre portion 114 of the first shaft 312 to a radially outwardly facing side 322 of the annular fin 318.

The second shaft assembly 330 comprises a second shaft 332 and an annular trough 340 extending radially outwardly of the second shaft 332.

As for the first embodiment, the first shaft 312 is concentrically accommodated within the second shaft 332 with the annular fin 318 accommodated within the annular trough 340.

A fluid delivery passageway 316 is provided in the first shaft 312. The fluid delivery passageway 316 extends axially along the first shaft 312 exhausting at an aperture 317 that is in fluid communication with the annular trough 340. In this arrangement, fluid delivery passageway 316 is oriented so as to direct fluid 150 radially outwardly through the aperture 317.

The seal assembly 360 comprises a first seal element 362, and a second seal element 364. Each of the first and second seal elements 362,364 takes the form of lift-off seals. In other arrangements, the first and second seal elements 362, 364 may be lip seals or any other form of rotating seal.

The first seal element 262 is positioned at one side of the annular trough 240 and seals the second shaft 232 against the first shaft 212. The second seal element 264 is positioned at the other axially opposite end of the annular trough 240 and seals the second shaft 232 against the first shaft 212.

In use, a fluid 150 is delivered to the annular trough 318 via the fluid delivery passageway 316. The presence of the seal elements 362,364 allows the delivery of the fluid 150 to pressurise the annular trough 340, and thereby deliver fluid to the centre portion 114 of the first shaft 312.

Subsequent operation of the fluid transfer coupling 300 is identical to that described above for the first embodiment of the disclosure.

Figure 4B:
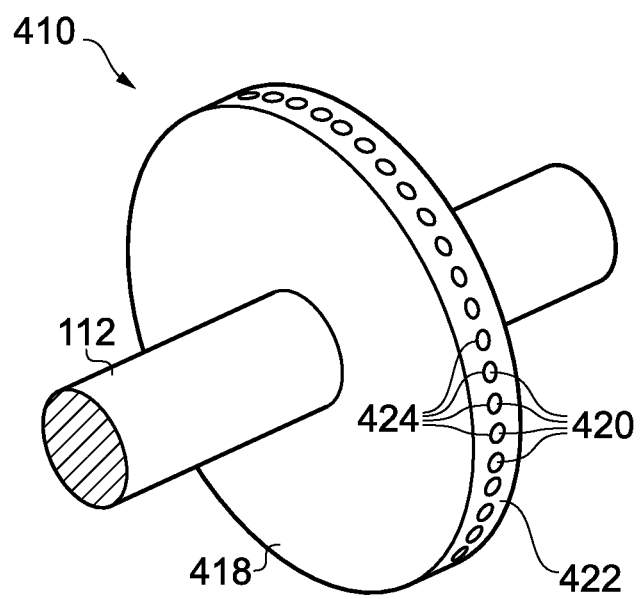
FIG. 4B shows a schematic perspective view of a first shaft assembly of a fluid transfer coupling according to a fourth embodiment of the invention.

FIG. 4B shows a first shaft assembly 410 of a fluid transfer coupling 400 (not shown) according to a fourth embodiment of the invention. Features of the first shaft assembly 410 which correspond to those of first shaft assembly 110 have been given corresponding reference numerals for ease of reference.

In the first shaft assembly 410 of this arrangement comprises a first shaft 112 and an annular fin 418. The annular fin 418 is attached to the first shaft 112.

The annular fin 418 comprises one or more internal passages 420. In this arrangement, the one or more internal passages 420 are formed as a plurality of holes 424, each of the holes 424 extending radially outwardly from the centre portion 114 of the first shaft 112 to a radially outwardly facing side 422 of the annular fin 418.

In use the fluid transfer coupling 400 operates in the same manner as outlined above in respect of the fluid transfer coupling 100.

Figure 5:
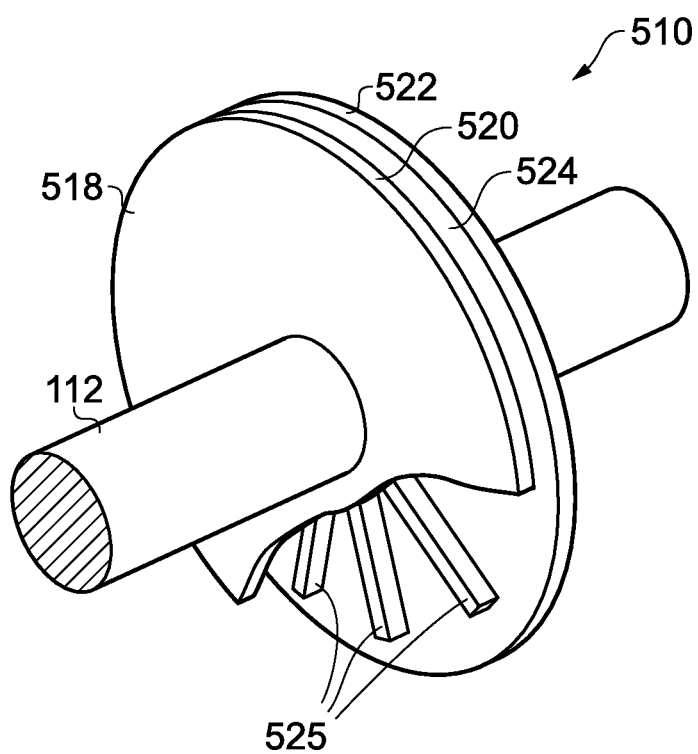
FIG. 5 shows a schematic partial sectional perspective view of a first shaft assembly of a fluid transfer coupling according to a fifth embodiment of the invention.

FIG. 5 shows a first shaft assembly 510 of a fluid transfer coupling 500 (not shown) according to a fifth embodiment of the invention. Features of the first shaft assembly 510 which correspond to those of first shaft assembly 110 have been given corresponding reference numerals for ease of reference.

In this arrangement, the first shaft assembly 510 comprises a first shaft 112 and an annular fin 518 attached to the first shaft 112. As outlined above for the previous embodiments, the annular fin 518 comprises one or more internal passages 520 in the form of a single annular volume 524.

The annular volume 524 fluidly connects the centre portion 114 of the first shaft 112 to a radially outwardly facing side 522 of the annular fin 518.

In this arrangement, the annular volume 524 is provided with a plurality of radially extending first vanes 525. These vanes 525 serve to minimise the circumferential velocity of fluid contained within and being driven through the annular volume 524.

In the example illustrated in FIG. 5, the first vanes 525 are equi-spaced circumferentially around the annular fin 518. In other arrangements, the first vanes may be unequally spaced around the circumference of the annular fin 518.

The first vanes 525 are shown as extending substantially linearly in a radial direction within the annular volume 524. In other arrangements the first vanes 525 may be curved in the radial direction.

Although illustrated with reference to the single annular volume 124 of the first embodiment of the fluid transfer coupling, it is to be understood that the radially extending first vanes 525 may equally be applied to the plurality of holes 424 of the fourth embodiment of the fluid transfer coupling 400.

In use the fluid transfer coupling 600 operates in the same manner as outlined above in respect of the fluid transfer coupling 100.

Figure 6:
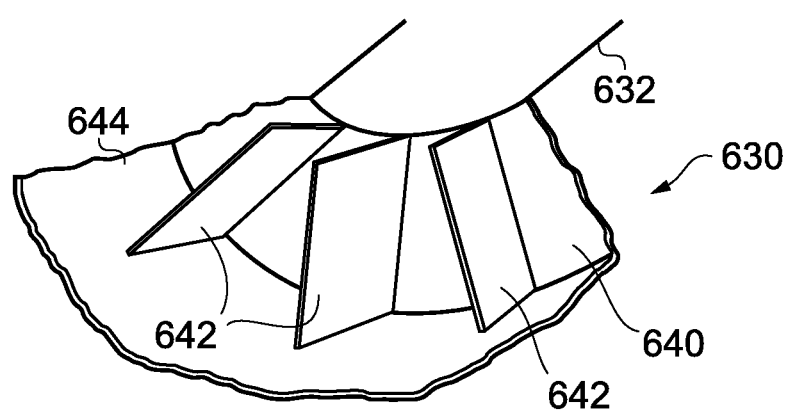
FIG. 6 shows a schematic partial perspective view of an annular trough of a fluid transfer coupling according to a sixth embodiment of the invention.

FIG. 6 shows a second shaft assembly 630 of a fluid transfer coupling 600 (not shown) according to a sixth embodiment of the invention that is designated generally by the reference numeral 600.

The fluid transfer coupling 600 comprises a first shaft assembly 110 and a second shaft assembly 630. The first shaft assembly 110 is as described above.

In this arrangement, the second shaft assembly 630 comprises a second shaft 632 and an annular trough 640 extending radially outwardly of the second shaft 632.

The annular trough 640 comprises a plurality of radially extending second vanes 642 projecting axially into a volume 644 defined by the annular trough 640.

In the arrangement of FIG. 6, these second vanes 642 extend axially from only one side of the annular trough 640. In other arrangements, the second vanes 642 may extend from both sides of the annular trough 640 into the volume 644.

In use the fluid transfer coupling 600 operates in the same manner as outlined above in respect of the fluid transfer coupling 100.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

What is claimed is:

1. A fluid transfer coupling comprising:
a first shaft assembly;
a second shaft assembly; and
a seal assembly,
the first shaft assembly comprising:
a first shaft; and
an annular fin attached to the first shaft, the annular fin having one or more internal passages extending therethrough, the or each internal passage connecting a centre portion of the first shaft to a radially outwardly facing side of the annular fin,
the second shaft assembly comprising:
a second shaft; and
an annular trough extending radially outwardly of the second shaft,
wherein the first shaft is concentrically accommodated within the second shaft with the annular fin accommodated within the annular trough, the seal assembly seals the annular trough, and
in use, a fluid is delivered to the annular trough, the first shaft assembly rotates at a first rotational speed and the second shaft assembly rotates at a second rotational speed, the second rotational speed being greater than the first rotational speed, the difference between the second rotational speed and the first rotational speed causes the fluid contained within the annular trough to be driven radially inwardly through the or each internal passage to the centre portion of the first shaft
wherein the fluid is delivered to the annular trough through one or more static oil jets positioned radially outwardly of the first shaft.

2. The fluid transfer coupling as claimed in claim 1, wherein the fluid is delivered to the annular trough through one or more passageways extending along a length of the first shaft.

3. The fluid transfer coupling as claimed in claim 1, wherein the fluid is delivered to the annular trough through one or more passageways extending along a length of the second shaft.

4. The fluid transfer coupling as claimed in claim 1, wherein the seal assembly comprises a first sealing element on a first end of the annular trough, and a second sealing element on a second axially opposite end of the annular trough, with the fluid being delivered to the annular trough between the first and second sealing elements.

5. The fluid transfer coupling as claimed in claim 1, wherein the or each passage comprises a single annular volume.

6. The fluid transfer coupling as claimed in claim 1, wherein the or each passage comprises a plurality of radially extending holes.

7. The fluid transfer coupling as claimed in claim 1, wherein the ratio of the second rotational speed to the first rotational speed is between approximately 6:1 and 2:1.

8. The fluid transfer coupling as claimed in claim 1, wherein the ratio of the second rotational speed to the first rotational speed is between approximately 5:1 and 3:1.

9. The fluid transfer coupling as claimed in claim 1, wherein the ratio of the second rotational speed to the first rotational speed is approximately 3:1.

10. The fluid transfer coupling as claimed in claim 1, wherein the first shaft assembly rotates in an opposite direction to the second shaft assembly.

11. The fluid transfer coupling as claimed in claim 1, wherein the or each internal passage comprises one or more radially extending first vanes arranged within the respective passage.

12. The fluid transfer coupling as claimed in claim 1, wherein the annular trough comprises a plurality of radially extending second vanes projecting axially into a volume defined by the annular trough.

13. The fluid transfer coupling as claimed in claim 1, wherein the or each internal passage has an axial dimension of between approximately 0.5 mm and 3 mm.

14. The fluid transfer coupling as claimed in claim 1, wherein the or each internal passage has an axial dimension of between approximately 0.5 mm and 1.5 mm.

15. A fluid transfer coupling comprising:
a first shaft assembly;
a second shaft assembly; and
a seal assembly,
the first shaft assembly comprising:
a first shaft; and
an annular fin attached to the first shaft, the annular fin having one or more internal passages extending therethrough, the or each internal passage connecting a centre portion of the first shaft to a radially outwardly facing side of the annular fin,
the second shaft assembly comprising:
a second shaft; and
an annular trough extending radially outwardly of the second shaft,
wherein the first shaft is concentrically accommodated within the second shaft with the annular fin accommodated within the annular trough, the seal assembly seals the annular trough, and
in use, a fluid is delivered to the annular trough, the first shaft assembly rotates at a first rotational speed and the second shaft assembly rotates at a second rotational speed, the second rotational speed being greater than the first rotational speed, the difference between the second rotational speed and the first rotational speed causes the fluid contained within the annular trough to be driven radially inwardly through the or each internal passage to the centre portion of the first shaft,
wherein the seal assembly comprises a first sealing element on a first end of the annular trough, and a second sealing element on a second axially opposite end of the annular trough, with the fluid being delivered to the annular trough between the first and second sealing elements,
wherein each of the sealing elements is a lift-off seal.

16. A fluid transfer coupling comprising:
a first shaft assembly;
a second shaft assembly; and
a seal assembly,
the first shaft assembly comprising:
a first shaft; and
an annular fin attached to the first shaft, the annular fin having one or more internal passages extending therethrough, the or each internal passage connecting a centre portion of the first shaft to a radially outwardly facing side of the annular fin,
the second shaft assembly comprising:
a second shaft; and
an annular trough extending radially outwardly of the second shaft,
wherein the first shaft is concentrically accommodated within the second shaft with the annular fin accommodated within the annular trough, the seal assembly seals the annular trough, and
in use, a fluid is delivered to the annular trough, the first shaft assembly rotates at a first rotational speed and the second shaft assembly rotates at a second rotational speed, the second rotational speed being greater than the first rotational speed, the difference between the second rotational speed and the first rotational speed causes the fluid contained within the annular trough to be driven radially inwardly through the or each internal passage to the centre portion of the first shaft,
wherein the seal assembly comprises a first sealing element on a first end of the annular trough, and second and third sealing elements on a second axially opposite end of the annular trough, with the fluid being delivered to the annular trough between the second and third sealing elements.

17. A method of using a fluid transfer coupling, the fluid transfer coupling comprising a first shaft assembly, a second shaft assembly, and a seal assembly, the first shaft assembly comprising a first shaft and an annular fin attached to the first shaft, the annular fin having one or more internal passages extending therethrough, the or each internal passage connecting a centre portion of the first shaft to a radially outwardly facing side of the annular fin, the second shaft assembly comprising a second shaft and an annular trough extending radially outwardly of the second shaft, the method comprising:
arranging the first shaft assembly concentrically within the second shaft assembly with the annular fin being accommodated within the annular trough, and with the seal assembly sealing the annular trough against a radially outwardly facing surface of the first shaft assembly;
introducing a supply of fluid to the annular trough through one or more static oil jets positioned radially outwardly of the first shaft; and
driving the first shaft assembly at a first rotational speed and the second shaft assembly at a second rotational speed, where the second rotational speed is greater than the first rotational speed; and
the difference between the second rotational speed and the first rotational speed causing the fluid to be driven radially inwardly from the trough through the or each internal passage to the centre of the first shaft.

18. The method as claimed in claim 17, wherein driving the first shaft assembly at a first rotational speed and the second shaft assembly at a second rotational speed further comprises:
driving the first shaft assembly at a first rotational speed and the second shaft assembly at a second rotational speed, and the ratio of the second rotational speed to the first rotational speed is between approximately 6:1 and 2:1.

19. The method as claimed in claim 17, wherein driving the first shaft assembly at a first rotational speed and the second shaft assembly at a second rotational speed further comprises:
driving the first shaft assembly at a first rotational speed and the second shaft assembly at a second rotational speed, and the ratio of the second rotational speed to the first rotational speed is between approximately 5:1 and 3:1.

20. The method as claimed in claim 17, wherein driving the first shaft assembly at a first rotational speed and the second shaft assembly at a second rotational speed further comprises:
driving the first shaft assembly at a first rotational speed and the second shaft assembly at a second rotational speed, and the ratio of the second rotational speed to the first rotational speed is approximately 4:1.

* * * * *